United States Patent
Sherman et al.

[11] Patent Number: 6,081,710
[45] Date of Patent: Jun. 27, 2000

[54] DYNAMIC TRAFFIC ALLOCATION FOR POWER CONTROL IN MULTIPLE SATELLITE COMMUNICATION SYSTEMS

[75] Inventors: Richard H. Sherman, Fremont; Stephen Boyd, Stanford; Delmer R. Schneider, Jr., Manteca, all of Calif.

[73] Assignee: Globalstar L.P., San Jose, Calif.

[21] Appl. No.: 08/890,864

[22] Filed: Jul. 10, 1997

[51] Int. Cl.[7] .............................. H04Q 7/20; H04B 7/185
[52] U.S. Cl. ..................... 455/428; 455/445; 455/13.4; 455/427; 455/12.1; 370/316
[58] Field of Search ................... 455/13.4, 38.3, 455/343, 574, 420, 430, 427, 445, 455; 370/316, 318

[56] References Cited

U.S. PATENT DOCUMENTS

| | | | |
|---|---|---|---|
| Re. 32,905 | 4/1989 | Baran ..................................... | 370/104 |
| 4,901,307 | 2/1990 | Gilhousen et al. ...................... | 370/18 |
| 5,010,317 | 4/1991 | Schwendeman et al. ............ | 340/311.1 |
| 5,073,900 | 12/1991 | Mallinckrodt .............................. | 375/1 |
| 5,081,703 | 1/1992 | Lee ......................................... | 455/13 |
| 5,109,390 | 4/1992 | Gilhousen et al. ........................ | 375/1 |
| 5,119,225 | 6/1992 | Grant et al. ............................. | 359/172 |
| 5,216,427 | 6/1993 | Yan et al. ............................... | 342/352 |
| 5,233,626 | 8/1993 | Ames ........................................ | 375/1 |
| 5,239,671 | 8/1993 | Linquist et al. ....................... | 455/13.1 |
| 5,265,119 | 11/1993 | Gilhousen et al. ........................ | 375/1 |
| 5,303,286 | 4/1994 | Wiedeman ................................. | 379/59 |
| 5,339,330 | 8/1994 | Mallinckrodt .............................. | 375/1 |
| 5,410,728 | 4/1995 | Bertiger et al. ........................ | 455/13.1 |
| 5,415,368 | 5/1995 | Horstein et al. ..................... | 244/158 R |
| 5,422,647 | 6/1995 | Hirshfield et al. ...................... | 342/354 |
| 5,433,726 | 7/1995 | Horstein et al. ..................... | 244/158 R |
| 5,439,190 | 8/1995 | Horstein et al. ......................... | 244/158 |
| 5,446,756 | 8/1995 | Mallinckrodt .......................... | 375/200 |
| 5,448,623 | 9/1995 | Wiedeman et al. ....................... | 379/59 |
| 5,551,624 | 9/1996 | Horstein et al. ..................... | 244/158 R |
| 5,611,505 | 3/1997 | Smay ....................................... | 244/165 |
| 5,625,868 | 4/1997 | Jan et al. ............................. | 455/13.4 |
| 5,831,976 | 11/1998 | Lin et al. ............................... | 455/453 |
| 5,862,478 | 1/1999 | Cutler, Jr. et al. ..................... | 455/428 |

Primary Examiner—Dwayne D. Bost
Assistant Examiner—Raymond B. Persino
Attorney, Agent, or Firm—Perman & Green, LLP

[57] ABSTRACT

A satellite communications system operative with at least one existing terrestrial communication system for carrying traffic is described. The communication system has a plurality of satellites in earth orbits, each satellite including a battery for sourcing electrical energy. The battery has energy sourcing limits. Gateways, bidirectionally linked to the plurality of satellites are also provided. A computing center, linked to the gateways, has a traffic control means for allocating traffic to the gateways. The traffic control means has three parts a power demand model for computing a first traffic allocation of traffic for each satellite; a satellite battery performance model descriptive of the energy sourcing limits of the on-board batteries; and a control law for applying weights to the first traffic allocation by using the battery performance model to obtain a second traffic allocation for each satellite. The second traffic allocation induces an electrical energy consumption in each of the satellites that is less than the battery energy sourcing limits.

10 Claims, 7 Drawing Sheets

DYNAMIC TRAFFIC ALLOCATION FOR POWER CONTROL IN MULTIPLE SATELLITE COMMUNICATION SYSTEMS

BACKGROUND OF THE INVENTION

1. Field of the Invention

This invention is related to Multiple Satellite Communication Systems. In particular, it is related to traffic control in a satellite network for optimizing battery utilization in each satellite.

2. Discussion of Related Art

Terrestrial cellular communication systems are well known. Multiple Satellite communication systems complement terrestrial cellular communication systems to augment traffic handling capacity and service areas where wire or cellular networks have not reached. Satellite systems came into existence in response to the need for efficient and economical mobile communications. In general, the satellites act as a transponder, or "bent pipe", receiving ground based transmissions from one location and beaming the repeated transmission back down to another location after amplification and frequency shifting, as discussed in U.S. Pat. No. 5,448,623, incorporated herein by reference in its entirety.

The amplification process for traffic handled by each satellite, and associated satellite systems, require electrical power, typically derived from gathering solar energy by solar arrays deployed by the satellite. Some of the energy obtained from solar arrays is stored in on board batteries for use at times when solar energy may be unavailable.

The cost of a satellite can be reduced by reducing the energy storage capacity, or ampere—hour rating of the on board battery. In turn, battery capacity can be reduced by controlling traffic related power consumption in the satellite. For this, various ground-based traffic allocation controls have beam implemented. Traffic allocation is desired because, in general, high satellite power consumption requires increased solar power gathering capacity and electrical energy storage, in turn leading to increased satellite mass and decreased reliability.

Solar power reaching the satellite is typically not constant over all portions of an orbit. Variations in the availability of solar power at the satellite arise from the inherent geometry associated with the path of Low-Earth-Orbit satellites around the earth. Eclipsed by the earth, perhaps as often as every orbit, solar power cannot always reach the satellite. Hence, solar power is sometimes unavailable to supply the electrical power required by a satellite during portions of each orbit. During eclipses, the power required is delivered by on board batteries. Battery power is also required when eclipse effects are further magnified by the variation of solar array efficiency with orbital position. This occurs, for example, where the angle between the spacecraft and the sun is low. Hence, satellite based battery power needs to be closely controlled and anticipated during a satellite's orbit to compensate for lack of solar energy during part of the orbit to achieve the satellite's mission.

In the prior art, ground-based traffic allocation is used to manually control the power consumption in satellites.

Such manual controls, if inaccurately implemented, or tardy, may contribute to discharging the satellite battery beyond desirable limits during periods of heavy communication traffic. In general, manual controls of the prior art comprised off-loading traffic from satellites having a low state of charge (SOC) to other satellites having a larger battery SOC. Manual methods were preferred over the more detailed and timely optimization of traffic of this invention because of its relative simplicity. Conventional systems of the prior art generally monitored a power parameter, such as instantaneous, single satellite traffic density, and allocated traffic accordingly. Other prior art also allocated traffic based on telemetry records reporting the historical state-of-charge of a satellite's battery over certain periods of time. However, manual traffic allocation, based on historical data, could be verified for its degree of optimization only long after its implementation, hence could not accommodate dynamic changes in traffic patterns.

Further in the prior art, the traffic allocation decision mechanism in a gateway generally used only local historic information available at that gateway. The traffic routing decision thus produced was based on local, generally incomplete information, generating suboptimal traffic and related power allocation.

Because of the variables discussed, as will be detailed in the present invention, optimizing the allocation of traffic for a particular satellite, needs to be centralized to consider past and future power consumption needs and orbital geometry. As well, a control function that properly weights initial and final conditions of a plurality of variables such as satellite battery state, desired future conditions of the satellite battery depth of discharge, the expected traffic demand, spacecraft system demand, and eclipses is required for optimum traffic routing. Prior art for solving similar these types of dynamic control problems are the Riccati matrix solutions, Convex Programming solutions and Dynamic Programming.

The Riccati matrix solution is a standard linear optimization method for use with dynamic systems. The Riccati solution considers both the initial and final conditions of the system, and then iterates between these conditions until some overall objective is optimized. However, the Riccati technique is applicable only to a linear problem structure. The factors influencing satellite cellular traffic allocation are significantly non-linear in their operation, hence the Riccati technique is limited in its application.

Another approach, the "Barrier" method, is used in Convex Programming, and reduces the computational burden of solving optimization problems using convergence and rate of convergence. These are well established in the context of Convex Programming. In satellite traffic allocation problems, however, convex programming is not very effective generally due to a lack of convexity of the associated data.

Another alternative presented in the prior art, Dynamic Programming, can be used for optimizing dynamic systems with little linear structure. However, dynamic programming is computationally intensive, hence not available in real time especially for large multiple satellite systems. A large number of satellites, with many beams and many separate channels for each satellite controlled by many gateways is relatively complex, perhaps including over one million values, and thus precludes, in many cases, a real time solution with current computing engines.

Another desired result of traffic control for power consumption optimization is limiting the Depth of Discharge (DOD) of satellite batteries, especially when traffic is heavy. Battery life is greatly influenced by DOD. Generally, if battery DOD drops below 60 percent, the life of the battery may be reduced substantially. Maintaining a long battery life is important to sustaining satellite system efficiency.

In light of the above limitations of the prior art, it is an objective of the present invention to provide a central satellite power allocation based on information gathered from a plurality of sources and locations.

It is another object of this invention to provide timely satellite power demand computations to assure the allocation of traffic in response to up-to-the-minute traffic estimates.

It is yet another object of the invention to consider a desired future state of battery charge in a plurality of satellites for optimally allocating traffic to a plurality of communication satellites.

It is a further object of the invention to accept various desired Depth of Discharge (DOD) levels for each of a plurality of satellites for optimization of traffic allocation with respect to these desired levels.

A further object of the invention is to determine an optimum power allocation considering world-wide forecasts of future traffic and measurements (i.e., telemetry) on the battery state-of-charge (SOC) for multiple satellites.

Yet another object of the invention is to partition the solution method of traffic allocation for compatibility with multiple processors, thus facilitating timely parallel computation of the traffic allocation for satellites in a satellite network.

Yet another object of the invention is to optimize traffic allocation among multiple satellites while considering typically higher uplink and downlink path losses during times when a satellite is at low elevation with respect to a gateway and/or terrestrial users typical transmitting/receiving grid point. During these times, when a satellite is below about 10 degrees of elevation with respect to a grid point, the beams have to traverse longer distances in the atmosphere and transmit losses are higher than at other elevation angles.

SUMMARY OF THE INVENTION

A traffic control system for allocating traffic to a plurality of gateways serving a plurality of satellites is described. The traffic control system comprises a power demand model for computing a first traffic allocation of traffic for each satellite of said plurality of satellites; a satellite battery performance model descriptive of energy sourcing limits of batteries associated with each satellite; and a control law for applying weights to said first traffic allocation using said battery performance model to obtain a second traffic allocation for each satellite of said plurality of satellites, said second traffic allocation inducing an electrical energy consumption in each of said satellites, said energy consumption being less than said battery energy sourcing limits.

This traffic control system is used in conjunction with a satellite communications system operative with at least one existing terrestrial communication system for carrying traffic. The satellite communication system comprises a plurality of satellites in earth orbits, each of said satellites including a battery for sourcing electric energy consumption, said battery having energy sourcing limits. Included are also one or more terrestrial gateways, said gateways bidirectionally linked to one or more satellites of said plurality of satellites for carrying said traffic. A computing center, linked to said gateways, computes and distributes said second traffic allocation to the gateways for implementation.

The battery model preferably uses a barrier function to simulate said energy sourcing limits. The control law uses a barrier function to apply weights to said first traffic allocation to obtain said second traffic allocation. The power demand model is used to verify that said second traffic allocation is in accordance with said energy sourcing limits.

BRIEF DESCRIPTION OF THE DRAWINGS

The features and advantages of the present invention will be better understood when the disclosure of a preferred embodiment given below is considered in conjunction with the drawings provided, wherein.

DETAILED DESCRIPTION OF THE PREFERRED EMBODIMENT

Figure 1:
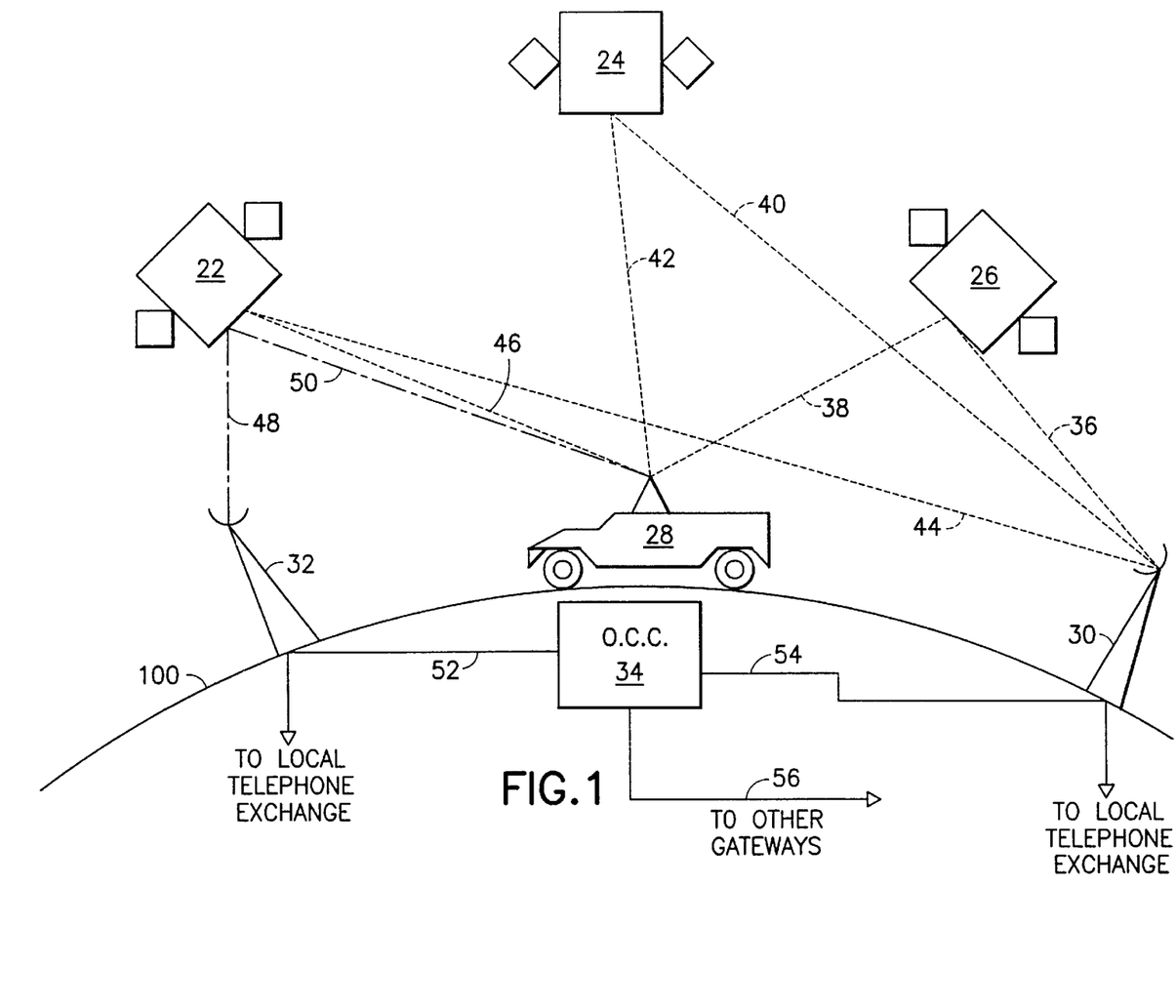
FIG. 1 shows the general environment where a Dynamic Traffic Allocation System is part of a multiple-satellite system.

In general, prevention of satellite battery discharge beyond certain limits in each satellite of a satellite constellation requires the control of satellite traffic to be conducted with an overall geometric view of the available satellite constellation, location of mobile users, and desired future battery requirements. As shown in FIG. 1, traffic control of an exemplary constellation of satellites 22, 24, and 26 can be achieved by using ground based points, or gateways 30 and 32 located on terrestrial surface 100. Gateways 30 and 32 have a list of channel allocations for each satellite 22, 24, 26 that are available to a particular gateway as a function of time for linking to mobile user 28. Also, each gateway 30 or 32 can allocate traffic to each channel on the list. It is understood that mobile user 28 can also be a concentrator, represented by a grid point, where traffic from multiple users is allocated for transmission to/from satellites 22, 24 and/or 26. Generally, gateways 30 and 32 are connected to the public telephone network, perhaps directly to the local telephone exchange. The public network can be viewed, in general, as a traffic concentrator for routing traffic to satellites 22, 24 and/or 26.

Operation control center (OCC) 34, for example, updates traffic allocation for each specific satellite to gateways 30 and 32 via typical links 52 and 54. Links 52 and 54 can be implemented using either conventional ground connections, cellular links, or satellite links. Similarly, link 56 connects other gateways to collect and distribute information required by each gateway for its traffic allocation. OCC 34 is a central computing point that computes the future allocation of traffic to each satellite in accordance with this invention. The gateways 30, and 32 in turn, implement the allocation of traffic computed by OCC 34 to their respective satellites after having been given the traffic allocation by OCC 34.

In general, user 28 can be served by gateway 30 using one of three possible transmission paths. First, gateway 30 can use satellite 26 to reach user 28 via links 36 and 38. Second, the same gateway 30 can reach user 28 by using satellite 24 using links 40 and 42. Thirdly, gateway 30 can use satellite 22 to reach user 28 using links 44 and 46. Hence, OCC 34 can optimize traffic allocation by choosing which satellite, 22, 24 or 26 is to carry traffic passing through either gateway 30 or gateway 32.

As any of satellites 22, 24, 26 continue to move in their orbits, it will become apparent that gateway 30 will have to re-allocate the path of traffic to and from user 28, for example from satellite 22 to satellite 24. For example, satellite 22 is low on the horizon with respect to gateway 30, and may have a low state of charge (SOC). If the orbital path of satellite 22 takes it further lower on the horizon with respect to gateway 30, transmission and reception power requirements may soon exceed allowable power limits, hence traffic from user 28 will be shifted from satellite 22 to a better situated satellite with a better SOC, such as satellite 24 or satellite 26. In the alternative, if no adequate substitutes for satellite 22 can be linked by gateway 30, the traffic from user 28 may be re-routed to gateway 32 for operation in conjunction with links 48 and 50. This re-routing of traffic from gateway 30 to gateway 32 is directed by messages from, and in conjunction with, computations from operations control center (OCC) 34.

It is an important feature of this invention that a central entity, such as the OCC 34, is capable of allocating traffic to a plurality of satellites, and has information about the state of charge (SOC) of the batteries for each of satellites 22, 24, 26 of said plurality of satellites, the electrical performance history of the satellites, and desired future SOC and depth of discharge (DOD). For example, a gateway in Hawaii, such as gateway 30, could be directed to choose between routing calls to one of two satellites, such as satellite 24 or satellite 26, both satellites having an equal SOC value. If satellite 24 was going to cover traffic conditions in Los Angeles, a heavy-traffic area, and satellite 26 was headed toward Alaska, a light-traffic area, then gateway 30 is preferably instructed by OCC 34 to allocate additional traffic to the satellite 26 headed toward Alaska. Clearly, the information necessary to allocate traffic to one or the other satellite is dependent on future satellite orbital location as well as other variables.

Traffic allocation decision making capability is centralized in OCC 34. Hence, each gateway 30 and 32 is updated periodically to include traffic parameters for allocation to satellites soon to be used, but not yet linked by gateways 30 or 32. At OCC 34, a future traffic allocation for all gateways in the network, such as exemplary gateways 30 and 32, and for all satellites, such as exemplary satellites 22, 24, and 26, is computed by the Dynamic Traffic Allocation System (DTAS) of this invention. The computation of this traffic allocation is performed for simulated time intervals projecting the future state of each parameter of the satellite network, subject to certain battery power and depth of discharge optimizing constraints.

Figure 2:
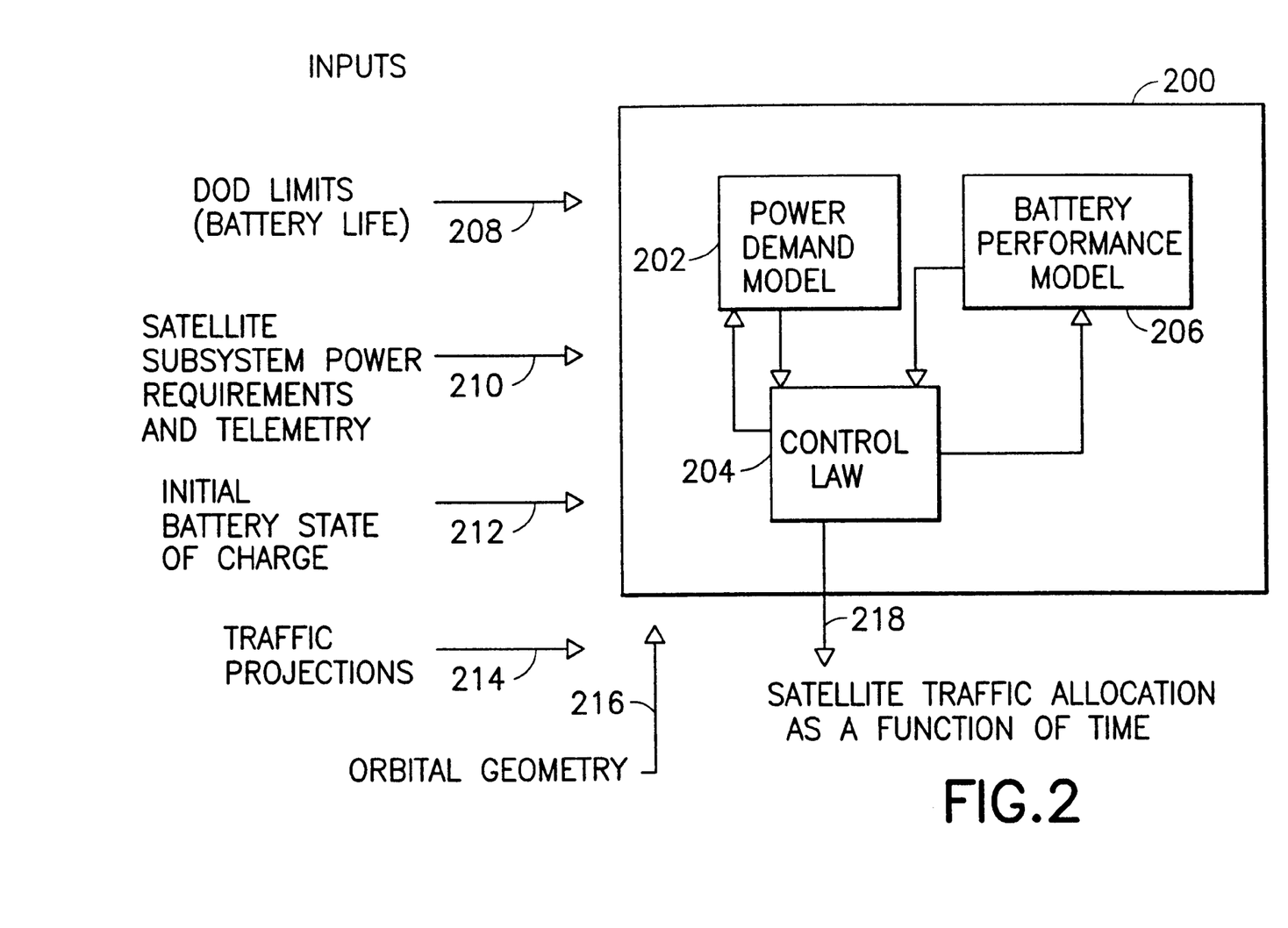
FIG. 2 shows the components comprising the Dynamic Traffic Allocation System (DTAS).

In accordance with FIG. 2, the Dynamic Traffic Allocation System (DTAS) 200 has a power demand model 202, a battery performance model 206, and a control law 204. The output from DTAS 200 is a satellite traffic allocation 218 for all satellites currently linked to one or more gateways, such as gateway 32.

One operator input to DTAS 200 is the desired limit on battery depth of discharge, 208, to assure battery longevity of each satellite. For example, this limit could be set at 70%, indicating that each satellite battery is not to be discharged more than 30 percent of its full charge over a full orbit, or over the length of the simulation interval.

Another input to DTAS 200 are projected satellite subsystem power requirements and other telemetry data that may be relevant to power consumption, 210, for each time increment over the simulation interval. Telemetry records 210, extracting future values from past satellite subsystem power requirements and telemetry of operating conditions, such as SOC for each particular satellite 22, 24, and 26, is input into DTAS 200 for inclusion within the simulation at OCC 34.

A forecast of communications traffic, or traffic projection 214, is input to DTAS 200. This forecast over the simulation interval is derived from historical records and service provider plans for each service area comprising a plurality of users, such as user 28.

Future orbital geometry data, 216, again projected over the length of the simulation interval, is also input to of DTAS 200. This data is relatively constant, and requires updating only when the satellite is repositioned in its orbit. Combining future orbital geometry data 216 with traffic projection 214 allows the computation of a link loss load for each particular satellite over its orbit associated with each grid point.

DTAS 200 is preferably implemented as a software process on a digital computer having a graphical display console. The software is designed to be modular, wherein the power demand model 202, battery performance model 206, and control law 204 are, optionally, run independently. A multiprocessor system wherein each of the processors can be dynamically assigned to portions of the computation, organized spatially by service area, can be used to implement each module 202, 204 and 206. Since each model can be run as computations on a separate processor, parallel processing is achieved, speeding up each of such separable operations for timely, real time results. The control law 204 is spatially separated to allow independent processes to be assigned to each component dynamically.

For example, at the OCC 34 the results from DTAS 200 computations are stored and used to model future traffic density and satellite battery conditions for each satellite available to gateways 30 in simulation increments of, for example, one second, ten seconds or one minute. DTAS 200 displays the traffic allocation results 218 of this simulation for each desired time increment to human operators for real-time confirmation, while it also generates traffic allocation instructions to gateways under its control, such as gateways 30 and 32.

DTAS 200 runs typically at a central location, such as OCC 34. The inputs to DTAS 200, such as 208, 210, 212, 214 and 216 need to be updated to insure that DTAS simulated future values are accurate, i.e. representative of actual conditions during the simulation interval. Any substantial departures in the simulated parameters from actual values experienced in the satellite network, as derived from actual, (now historical) satellite telemetry data can be used to refine the projection mechanism for each individual input. Typically it is user traffic projections 214 that need to be updated and refined relatively frequently due to the changing nature of this input. Depending on traffic changes, and quality of traffic projections 214, these update periods may be quite long, reducing the need for immediate communication between OCC 34 and a multitude of gateways, such as 30 and 32. It is also noted that traffic projections 214, a variable with a high rate of change that may need to be updated frequently, can be transmitted directly from an exemplary service provider associated with user 28 by a gateway currently serving user 28, such as gateway 32, and forwarded to OCC 34 via link 52 in a timely fashion for updating the DTAS 200 simulation.

Operation

As shown in FIG. 2, DTAS 200 contains three processing modules, a power-demand model 202, a satellite battery performance model 206, and a control law 204. The battery model 206 uses a barrier function to calculate the existing DOD constraint for multiple satellites. Initially, the power demand model 202 allocates traffic to particular links such as 40 and 42, assuming that all satellites, e.g., 22, 24, and 26, are used equally, that is, each carry an equal amount of traffic. Based on this equi-distribution of traffic, power demand model 202 then determines the future SOC values for the battery in each satellite. Control law 204 then uses the predicted, yet unweighted, SOC from power demand model 202, to calculate weights for prioritizing the allocation of traffic to each satellite in accordance with information from battery performance model 206. The power demand model 202 is then again employed, this time to verify the weighted results computed by control law 204, i.e., the final traffic allocation. This verification assures that the proposed satellite traffic allocation as a function of time, 218, produces satisfactory future SOC values for respective batteries in each satellite. Once the weighted values computed by control law 204 are validated by demand model 202, they become the resultant satellite traffic allocation as a function of time 218. Now validated, allocation 218 is transmitted to the gateways, such as 30 and 32, for implementation in directing traffic to satellites 22, 24, and 26. The result is an optimized allocation of future incoming traffic routed via satellites 22, 24 and 26, using gateways 30 and 32 in accordance with the computed allocation 218.

Power Demand Model

The power demand model 202 of FIG. 2 allocates traffic to particular links, assuming, on a first pass, that all satellites are used equally. Based on this simplifying assumption, model 202 calculates future SOC values for each satellite for each simulation time increment.

The power-demand model 202 uses mathematical programming techniques to solve for the power required for each link, such as 40 and/or 42 at each instant in time. For example, allocation of calls to a given satellite are governed by the product of the weights assigned to it, times the total power available on that satellite.

Alternatively, the power demand model can be a set of analytic expressions that compute satellite power. The weights are used to skew the allocation of calls to some satellites having desirable SOC, low DOD, or other desirable states.

The input to the power-demand model 202 comprises forecasts of user terminal traffic, traffic projection 214, and the weighting values for various satellites from control law 204. The power-demand model 202 computes the power demand based on projected traffic for each time step in the simulation. The power demand model output is a power vector and a set of geographic parameters along the orbit of each satellite for each time increment. The information thus computed is passed on to control law 204 for further optimization.

After control law 204 has re-computed the data by further weighting each allocation, power demand model 202 is again employed to verify that the weighted results from control law 204, the final traffic allocation, produces satisfactory future SOC values for respective batteries in each satellite. In general, these future SOC values are sufficiently far into the future to allow manual review before the projected traffic allocation is implemented by the gateways.

Battery Performance Model

The satellite battery model 206 describes charging and discharging behavior of the batteries used by the satellites. The battery model uses a barrier function to calculate the existing DOD constraint for multiple satellites. The inputs to the battery performance model 206 are radio frequency (RF) power demand values for a given satellite's transmitting antennas, in response to traffic allocation from control law 204, and a DC power demand for operating the satellite's subsystems for each simulation time increment. These values then are simulated forward in time by one time increment, typically one second to one minute. For fast varying traffic patterns, the typical time increment is one second.

There are two parts to the battery model 206. The first part characterizes battery discharge capacity or behavior of the battery over time. The second part characterizes satellite battery charging behavior and the projected longevity of the satellite battery based on projections derived from the first part. Both parts used manufacturer's data and telemetry of actual performance to update their results for each time increment during the simulation.

A battery charge/discharge model is generally created for a particular satellite battery at the time of manufacture. This model determines certain characteristics, such as operating voltage, amp-hour capacity, number of charge/discharge cycles as a function of battery depth of discharge, etc. In general, the battery performance model 206 assumes a discharge cycle will complete every orbit, e.g., every 112 minutes. The depth-of-discharge, DOD, is measured as a percentage of energy remaining in the battery at a certain time t, as compared with the fully-charged state.

The best measure of battery life, against which battery performance projections can be measured, is a SOC telemetry profile accumulated discharge cycle. The DOD value is below 70% at all times, and is no more than 60% before entering an eclipse, in those cases where the electrical load is removed from the battery circuit during the eclipse.

The batteries' discharge efficiency characteristically has an exponential decay. For example, if the battery is to provide 100 watts, typically 105 watts must go into the battery at the beginning of its life, but 110 watts must be supplied to the battery to recharge it toward its end of life. These details are included in the battery recharge model.

In general, the total payload power demand is the sum of the solar array/battery-charging load, satellite power bus load, C-band (gateway/satellite feeder) link load, and S-band (satellite to user) link load. Approximation polynomials for the charging and discharging characteristics of a battery cell are used to model this load. The function is most generally described as follows:

$$\frac{dx}{dt} = bat(SolarArray, Demand(U_{sg,cb}))$$

The power demand power variable "U" reflects it's importance as a control variable that is supplied to the dynamics of DTAS 200. The state-of-charge, SOC, is the ratio of the charge state, x, and the battery capacity. The SOC must remain below saturation and must discharge a minimum of 30% of the total charge in each discharge cycle to avoid "memory" problems typical of nickel cadmium batteries.

The barrier function inputs the battery state-of-charge of a satellite (SOC) and outputs a weighing vector W for that satellite. The approach is to treat the dynamic system as a 2-point boundary value problem. The initial and desired final state-of-charge (SOC) for each satellite battery are used. The power demand solution determines the final SOC by solving the power demand problem at each increment of simulation time.

The power demand solution's terminal state values are determined by assuming equal satellite usage power demand solution. That is, initially in the simulation, each satellite is assumed to handle an equal amount of traffic irrespective of its battery state or other variables. One or more iterations are then made before reaching a final optimum SOC for all satellites. The objective is to provide a balanced weighing vector.

Control Law

The control law 204 uses the predicted SOC to calculate weights for prioritizing the allocation of traffic to each satellite. In effect, a vector weighted more by the initial battery SOC is calculated. For this, a "barrier" function is used. The control law is a barrier function including the product of two terms that are minimized over a stated time interval. One term restricts the availability of satellites having SOC's that are close to the discharge limit. The other term penalizes predictions as a function of their remoteness from the present moment. As the simulation continues farther into the future, the greater the uncertainty of the results. Hence, the larger the uncertainty the less weight the predictions are granted.

The barrier function implements weighing decisions to use satellites with poor battery conditions and predictions made at time t into the future thusly:

$$w(s, t) = e^{(-t\lambda)} \ln\left(\frac{1}{x(t) - 0.3}\right)$$

where t is "simulation time", in seconds, of the particular computation that have elapsed since time zero, typically the start time of the current simulation; and $\lambda$ is a time constant associated with the future uncertainty in the discharge of the battery and duration of one orbit, for example, about 100 minutes. This parameter can be adjusted for different values depending on traffic conditions and the accuracy of traffic predictions.

The SOC as a function of time t defines this function, rather than just a terminal SOC value.

A predetermined discharge limit value, for example "0.3", is subtracted from the time-varying State-of-Charge variable, x(t). The result, w(s,t), is a number between 1 and 10. The new weighing vector is then determined across the simulation time as follows:

$$\underline{w} = \begin{bmatrix} x_1(t_f) \\ \cdots \\ x_s(t_f) \end{bmatrix}^{-1}$$

where $t_f$ is the final time associated with the simulation. Terminal state values are determined by the equal-usage power-demand solution. One or more iterations are then made before reaching a final, optimum SOC for all satellites.

Best Mode

A first example for using this invention, an apparatus and method for anticipating the power needs in a satellite network, is applied to a relatively simple configuration. This first configuration has a forward link for one grid point K=1, with three satellites, S=3, and one gateway, G=1. There are 200 users at the grid point, all on the same channel C=1.

A linear combination of the power received at the grid point from the users, and a linear programming (Lp) solution for the optimum diversity is used. This does not adequately model the system for all purposes. The Lp solution for this model is generally used to pick the one satellite having the least loss in the downlink path.

Figure 3:
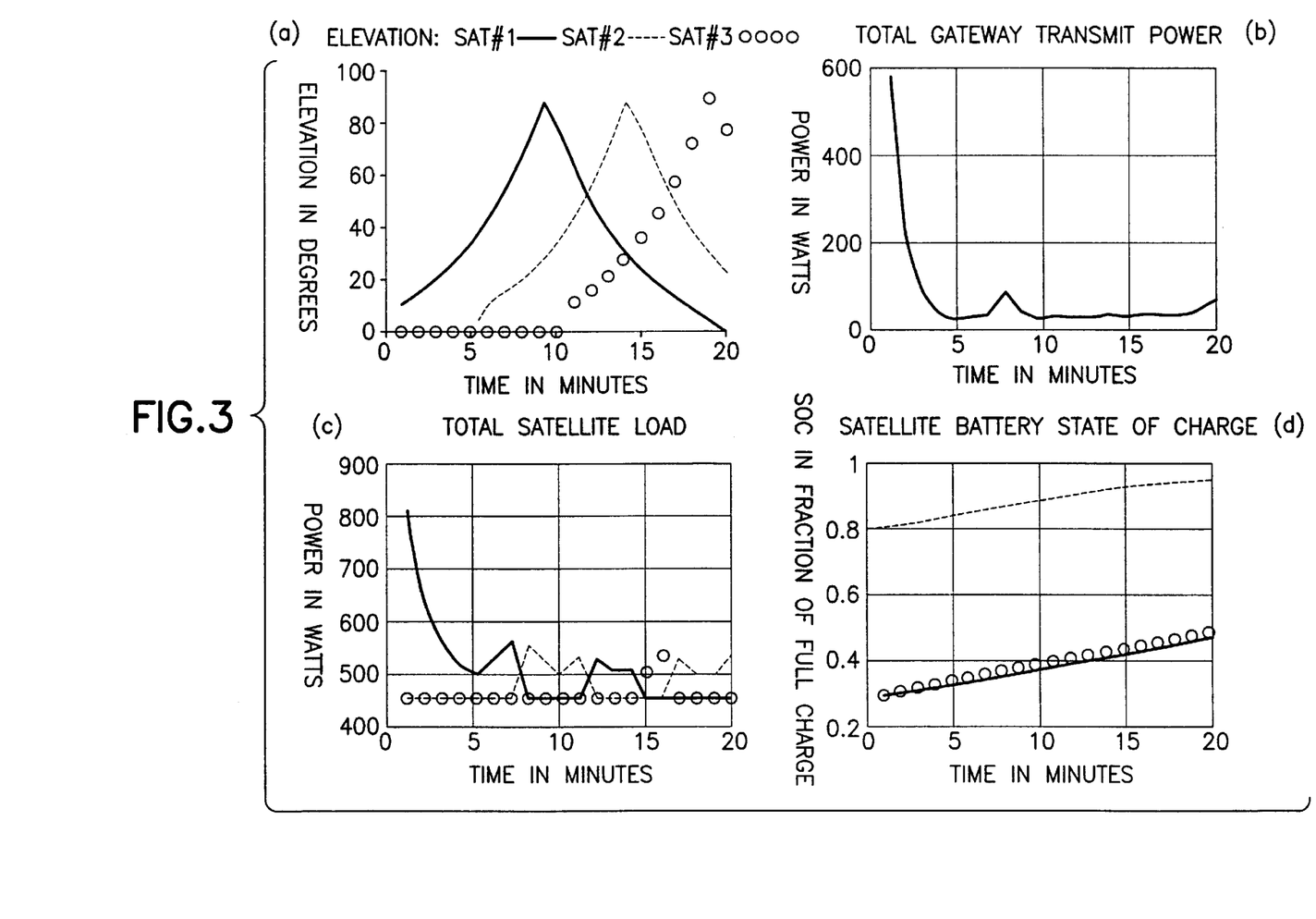
FIG. 3 illustrates exemplary inputs used by DTAS of FIG. 2 in the case where there are three satellites, one gateway, one channel, and one terrestrial traffic concentration point.

FIG. 3 illustrates the impact of a grid-point's traffic on gateway and satellite operations and battery charge state. The left upper corner (a) shows three satellite orbits, described by their elevation angle relative to a grid point. The satellite orbits are assumed simple, circular Kepler orbits that pass directly overhead of the grid point. Each satellite is designated with a differently-shaped line. The offset between satellites shown in FIG. 3 is for illustration purposes and chosen to clarify the example.

The upper right plot in FIG. 3 (b) is the gateway transmitting power range for the optimum solution. As shown, except for the first few minutes, when only a low-elevation angle is available, the power is below 100 watts. The largest power demand occurs when a low, 10-degree elevation angle above the horizon is the highest satellite elevation available.

The lower left-hand plot (c) is the total load on each satellite offered optimum traffic allocation. The basic load of 450 watts is a constant budget for each satellite's systems and C-band to the link. The Lp algorithm has selected one path on each satellite: Satellite #1 for 12 minutes, Satellite #2 for 4 minutes and Satellite #3 for 4 minutes. The choice of which satellite to use for traffic allocation depends upon the link loss for the entire forward link. The explanation of link loss for the S-band satellite-transmitter antenna, and handheld user-transmitter antennas, is discussed below along with FIG. 4.

The lower right plot of FIG. 3 (d) is the state-of-charge (SOC) of the satellites' batteries for the selected power allocation. (The satellites are assumed to have been in sunlight.) The initial SOC values are: satellite #2 charged, and satellites #1 and #3 nearly discharged. Although the figure assumes the existence of an actual battery in the model, the SOC slope is nearly a linear integration of the solar cell power minus the total satellite load. The initial spike of 350 watts on satellite #1 has a negligible effect on battery SOC.

Figure 4:
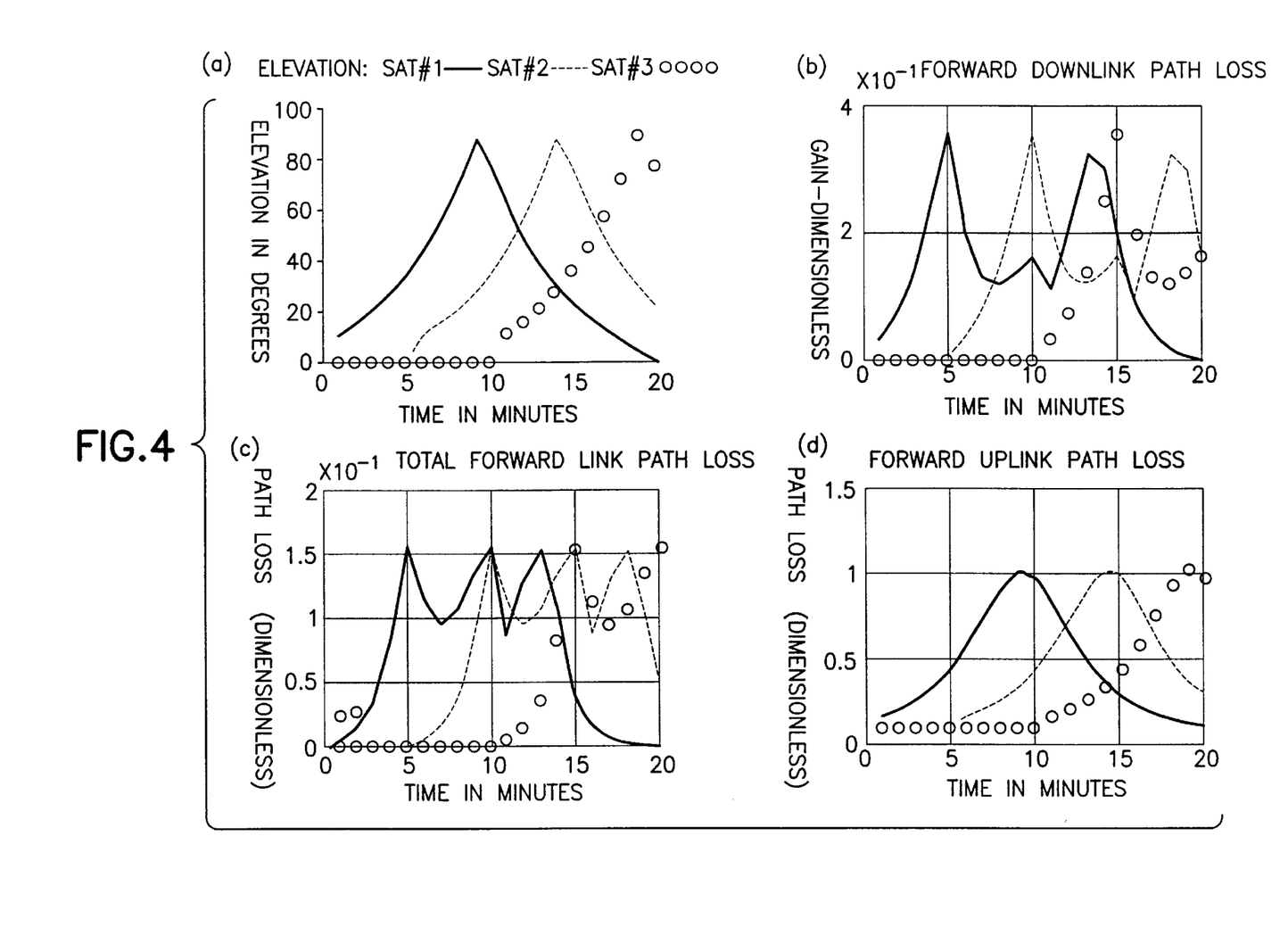
FIG. 4 illustrates satellite power demand as determined by the power demand model of the configuration of FIG. 3.

FIG. 4 illustrates the operation of the Lp "link diversity" algorithm in allocating traffic to satellites. The algorithm precludes from use those links having a signal-to-noise interference ratio (SNIR) of 3.5 dB or less. This minimizes total satellite system power. No other constraints are used in this example. In the upper left corner (a) of FIG. 4, the elevations of the satellites are again shown, for reference.

The upper right corner plot (b) of FIG. 4 is the total C-link downlink path loss. This reflects the effect of free space loss, as well as the gains of the S-band receive and transmit antennas used on the satellite and handheld receiver, respectively. The shape of the curve illustrates that the forward downlink gain is best at around 45 degrees. The smaller gain at higher elevation is due to both antenna gain and fading terms.

FIG. 4, lower left corner, (c), illustrates the total forward link path loss, including the C-band link. It is clear from this and the last plot that at time=10 minutes satellite #2 has the preferred path loss, also, that the traffic allocation must reflect these losses, not just the height of the satellite's elevation above the horizon.

FIG. 4, lower right plot (d), provides the forward uplink path loss which is very closely correlated with elevation angle. The C-link model is based only on free space loss, without any fading terms.

The optimization model chooses one satellite path at each instance of time that has the best path gain. The path with the best gain is not necessarily the best choice from an overall perspective. In particular, this choice leads to changing paths too often within the same, one satellite beam-coverage area because of antenna gains and fading effects. Additional, dynamic criteria may be used to make better allocation choices.

The dynamic criteria are based on a two-dimensional model of the Earth, for satellites in Low Earth Orbit. The model assumes: (1) that users are regularly spaced around the Earth, (2) that no users in the eclipse are requesting service, and (3) that the satellite is in a Kepler orbit. An eclipse of the Sun by the Earth lasts, by example, for 28 minutes in this orbit and a satellite appears at a low elevation of 10 degrees, increases to 90 degrees, and returns to 10 degrees with respect to a ground grid point.

Second example, having a more complex configuration, has six gateways G=6, six satellites S=6, one channel C=1, five beams B=5, and 113 grid points, K=113. This example applies additional dynamic user loads: i.e., the new grid points have a constant load for the period of one satellite track, e.g., 18 minutes. No power control is used. The initial state of charge on all of the satellite batteries is assumed to be 30%.

The algorithm selects the best path gain, with equal weighting applied to all satellites.

Figure 5:
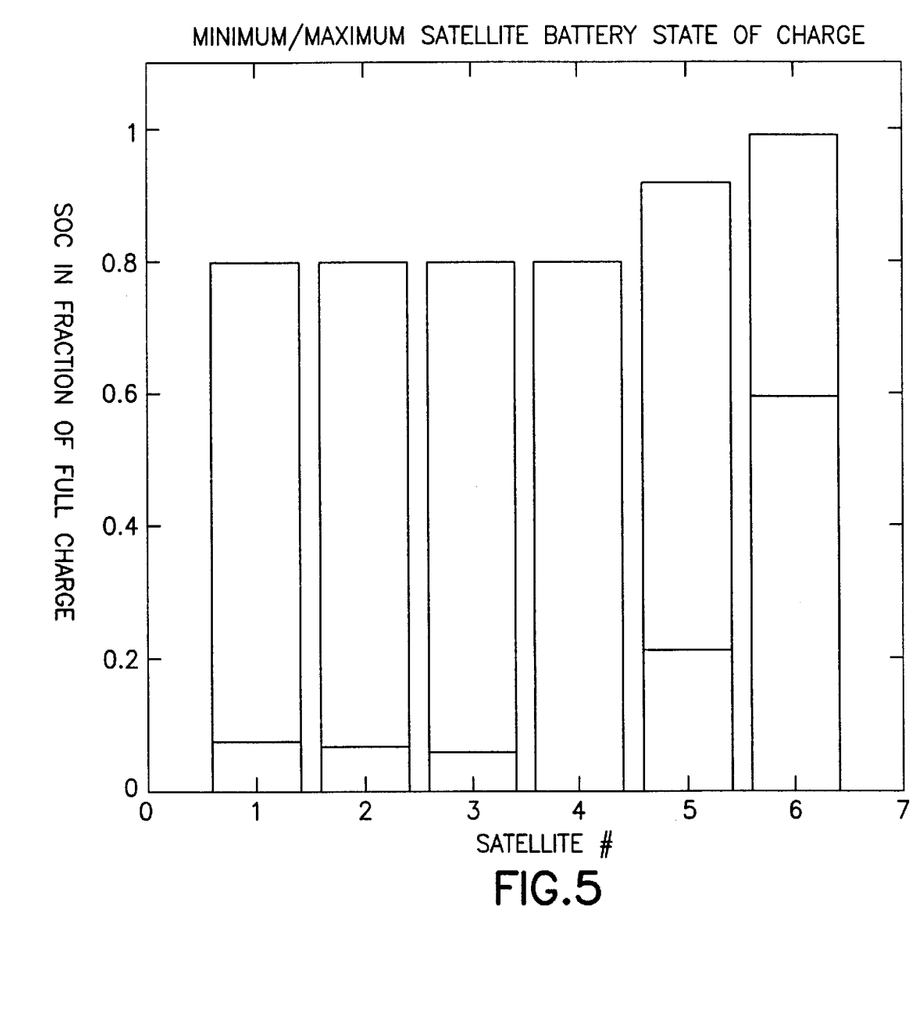
FIG. 5 is the satellite battery depth-of-discharge histogram for satellites for another exemplary communication system having six satellites.

When six more grid points, which provide dynamic loads, are then added to the system, the histogram of the state-of-charge (SOC) becomes asymmetric, as shown in FIG. 5. Satellites affected by the dynamic load have a deeper depth of discharge.

Figure 6:
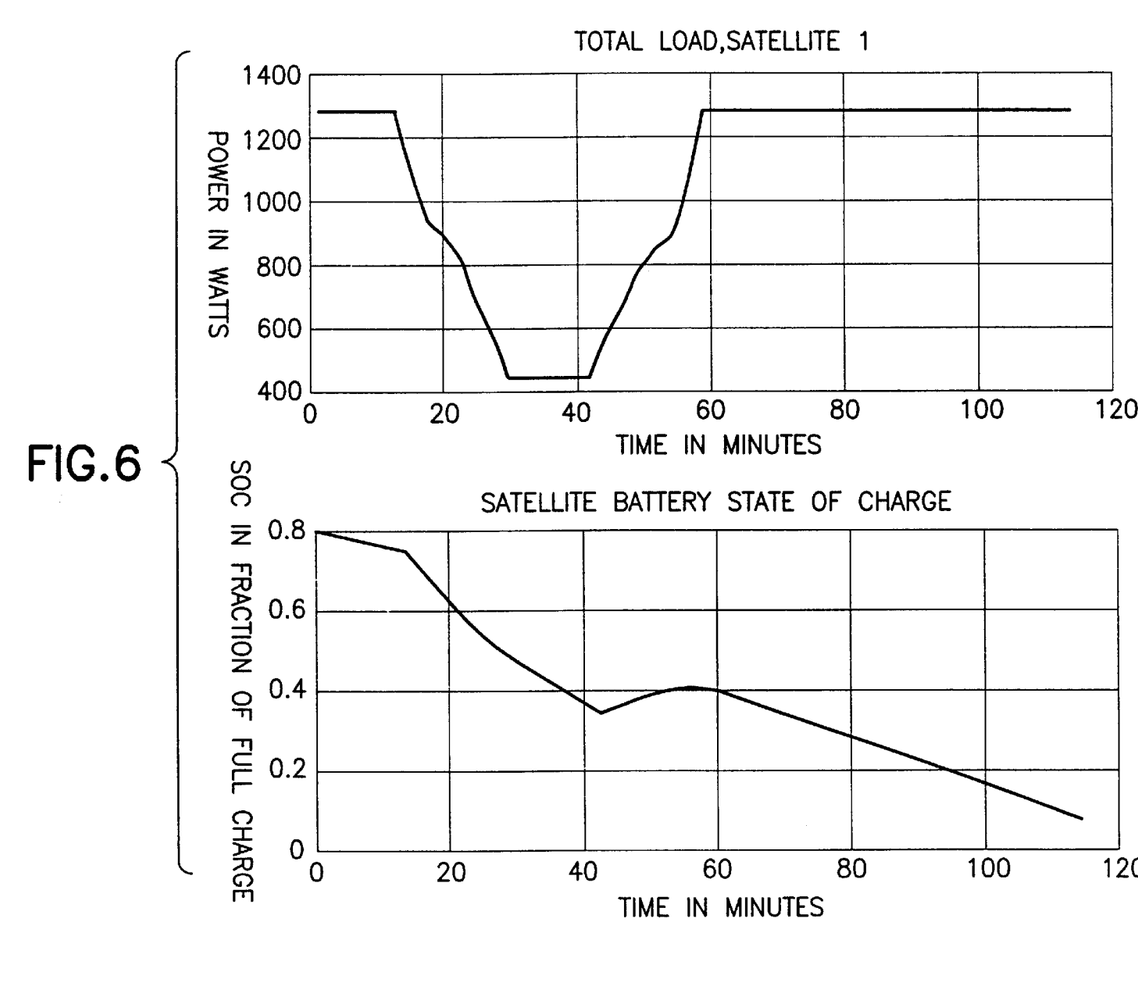
FIG. 6 is a satellite battery state-of-charge diagram for the exemplary configuration showing the load on satellite 1, and state of charge as a function of time.

The state-of-charge (SOC) plot for a given satellite across time is shown in FIG. 6. In this example, there is beam-to-beam and satellite-to-satellite self-interference, but not gateway-to-gateway self-interference. Since the battery is charged and discharged during each orbital cycle, the histogram of battery state-of-charge summed over three cycles versus satellite bins is symmetric. The minimum battery state-of-charge (SOC) is 30% and the maximum is 80%. All satellites are treated equally, in that traffic is allocated equally to all satellites.

Figure 7:
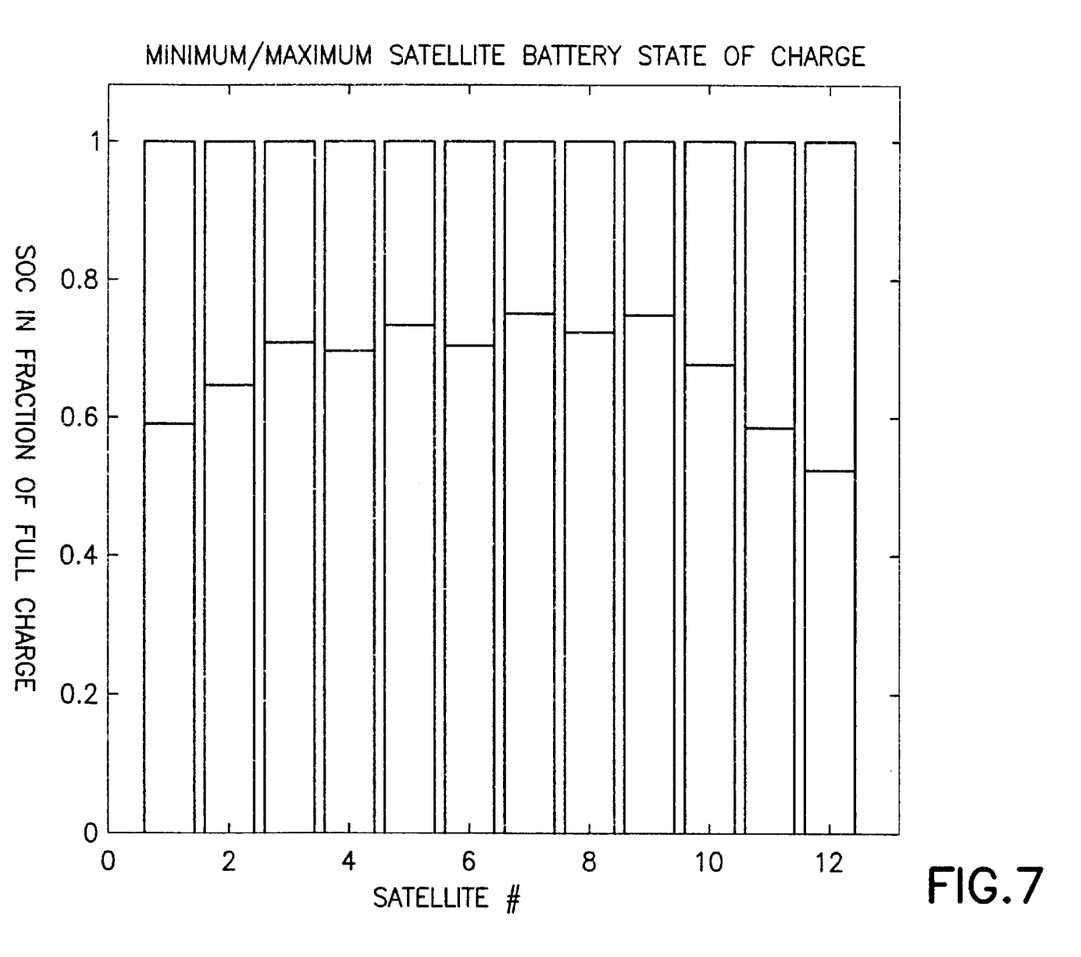
FIG. 7 is a histogram showing the minimum/maximum satellite battery state of charge for an optimized traffic allocation computed with the Dynamic Traffic Allocation System for a configuration of 12 satellites.

In FIG. 7, modifying the above configuration by adding six more satellites for a total of 12, an improved set of results is achieved, in accordance with this invention. In FIG. 7, the power control law selects the "best" of those twelve satellites, the highest priority satellite, the one having the lowest battery related weighing values for the heaviest traffic. After making this allocation to the satellites, the histogram of state-of-charge (SOC) is then, once again, nearly symmetric, as illustrated in FIG. 7. This is because those satellites that experience the dynamic load are lower priority. In both systems a broadcast channel is assumed to be shared by a number of distributed users. In this case, the new grid points have a constant load for the period of one satellite track, e.g., 18 minutes. Power control is used to determine the highest priority satellites. The initial state of charge on all satellite batteries is 80%. There is self interference due both to beam to beam and satellite to satellite interference. There is no gateway to gateway self interference, as gateways are typically sufficiently spaced.

As can understood from the foregoing disclosure, the solution is computationally efficient. Over the short term, about 1–12 days, the power demand model in accordance with the present invention indicates which satellites are used most heavily. Over the long-term (e.g., 1–7.5 years), the usage of satellite orbital constellation is nearly random with respect to ground-based demand points. In general, the power demand model associates a gross traffic load with an actual geographic location, and actual satellites with their respective orbits and batteries. The computation may use either a closed-loop expression that includes a constant feed-back gain in its self-interference terms, or a more exactly specified statement of the problem, solved using Linear Programming techniques.

The invention has been explained with reference to specific embodiments. Other embodiments will be apparent to those of ordinary skill in this art in light of this disclosure. It is therefore not intended that this invention be limited, except as indicated by the appended claims.

What is claimed is:

1. A satellite communications system operative with at least one existing terrestrial communication system for carrying traffic, comprising:
   a plurality of satellites in earth orbits, each of said satellites including a battery for sourcing electrical energy, said battery having energy sourcing limits;
   one or more terrestrial gateways, said gateways bidirectionally linked to one or more satellites of said plurality of satellites for carrying said traffic;
   a computing center, linked to said gateways, having a traffic control means for allocating said traffic to said gateways, said traffic control means comprising:
      a power demand model for computing a first traffic allocation of traffic for each satellite of said plurality of satellites;
      a satellite battery performance model descriptive of said energy sourcing limits; and
      a control law for applying weighting values to said first traffic allocation to obtain a second traffic allocation for each satellite of said plurality of satellites, said second traffic allocation inducing an electrical energy consumption in each of said satellites that is less than said battery energy sourcing limits, wherein said weighting values are based on said battery performance model.

2. The satellite communication system of claim 1 wherein said battery model uses a barrier function to simulate said energy sourcing limits.

3. The satellite communication system of claim 1 wherein said first allocation allocates traffic to each of said plurality of satellites equally.

4. The satellite communication system of claim 1 wherein said control law uses a barrier function to apply weight values to said first traffic allocation to obtain said second traffic allocation.

5. The satellite communication system of claim 1 wherein said power demand model is used to verify said second traffic allocation is within said energy sourcing limits.

6. A method for allocating traffic in a satellite communication system operative with at least one existing terrestrial communication system for carrying traffic comprising the steps of:
   providing a plurality of satellites in earth orbits, each of said satellites including a battery for sourcing electrical energy, said battery having energy sourcing limits;
   providing one or more terrestrial gateways, said gateways bidirectionally linked to one or more satellites of said plurality of satellites for carrying said traffic;
   linking a computing center to said gateways, said computing center using a traffic control method for allocating said traffic to said gateways, said traffic control method comprising the steps of:
      computing a power demand model descriptive of a first traffic allocation of traffic for each satellite of said plurality of satellites;

computing a satellite battery performance model predicting said energy sourcing limits; and applying weighting values to said first traffic allocation with a control law to obtain a second traffic allocation for each satellite of said plurality of satellites, wherein said second traffic allocation induces an electrical energy consumption in each of said satellites that is less than said battery energy sourcing limits, said weighting values being based on said battery performance model.

7. The satellite communication method of claim 6 wherein said step of computing a battery performance model includes computing a barrier function to simulate said energy sourcing limits.

8. The satellite communication method of claim 6 wherein said step of computing said power demand model allocates traffic to each of said plurality of satellites equally.

9. The satellite communication method of claim 6 wherein said step of applying weighting values with a control law uses a barrier function to apply said weighting values to said first traffic allocation to obtain said second traffic allocation.

10. The satellite communication system of claim 6 wherein said step of computing said power demand model includes a verification step for verifying that said second traffic allocation is within said energy sourcing limits.

* * * * *